(12) United States Patent
Blanchard et al.

(10) Patent No.: US 8,905,710 B2
(45) Date of Patent: Dec. 9, 2014

(54) TURBINE ENGINE ROTOR WHEEL WITH BLADES MADE OF A COMPOSITE MATERIAL PROVIDED WITH A SPRING RING

(75) Inventors: Stephane Blanchard, Chartrettes (FR); Alain Gendraud, Vernou la Celle sur Seine (FR)

(73) Assignee: SNECMA, Paris (FR)

( * ) Notice: Subject to any disclaimer, the term of this patent is extended or adjusted under 35 U.S.C. 154(b) by 751 days.

(21) Appl. No.: 13/141,857

(22) PCT Filed: Dec. 22, 2009

(86) PCT No.: PCT/FR2009/052655
§ 371 (c)(1),
(2), (4) Date: Jun. 23, 2011

(87) PCT Pub. No.: WO2010/072968
PCT Pub. Date: Jul. 1, 2010

(65) Prior Publication Data
US 2011/0268561 A1    Nov. 3, 2011

(30) Foreign Application Priority Data

Dec. 23, 2008   (FR) ...................................... 08 58999

(51) Int. Cl.
| | |
|---|---|
| *F01D 11/02* | (2006.01) |
| *F01D 5/30* | (2006.01) |
| *F01D 5/28* | (2006.01) |
| *F01D 11/18* | (2006.01) |
| *F01D 5/32* | (2006.01) |

(52) U.S. Cl.
CPC ................. *F01D 11/18* (2013.01); *F01D 5/303* (2013.01); *F01D 5/282* (2013.01); *Y02T 50/672* (2013.01); *F01D 5/32* (2013.01)
USPC ........................................ 415/173.3; 416/218

(58) Field of Classification Search
CPC ........... F01D 5/32; F01D 5/282; F01D 5/303; F01D 11/18

USPC .................... 416/214 A, 215, 218; 29/889.21
See application file for complete search history.

(56) References Cited

U.S. PATENT DOCUMENTS

| | | | |
|---|---|---|---|
| 955,648 A * | 4/1910 | King | .......................... 416/198 R |
| 1,345,678 A | 7/1920 | Kasley et al. | |

(Continued)

FOREIGN PATENT DOCUMENTS

| | | |
|---|---|---|
| EP | 0 524 876 | 1/1993 |
| EP | 1 818 507 | 8/2007 |

(Continued)

OTHER PUBLICATIONS

International Search Report issued May 7, 2010 in PCT/FR09/52655 filed Dec. 22, 2009.
U.S. Appl. No. 13/059,790, filed Jun. 14, 2011, Blanchard, et al.

*Primary Examiner* — Ned Landrum
*Assistant Examiner* — Woody A Lee, Jr.
(74) *Attorney, Agent, or Firm* — Oblon, Spivak, McClelland, Maier & Neustadt, L.L.P.

(57) ABSTRACT

A turbomachine rotor wheel including blades made of composite material; an annular mounting plate; a plurality of composite material blades mounted on the mounting plate, each blade also including a top platform at its tip carrying radial labyrinth teeth; an orientation disk fastened coaxially around the mounting plate and including at its outer periphery a plurality of axial slots that are open at one end, each slot presenting a cross-section that matches the cross-section of a blade root so as to hold it angularly in position by co-operation of shapes; and a variable-diameter spring ring housed in part in an axial notch formed in each blade root and projecting axially relative thereto, the spring ring to come into radial abutment against an inside surface of the orientation disk during radial outward movement of the blades relative to the mounting plate.

5 Claims, 4 Drawing Sheets

(56) References Cited

U.S. PATENT DOCUMENTS

| | | |
|---|---|---|
| 1,876,067 A | 9/1932 | Lorenzen |
| 2,686,655 A | 8/1954 | Schoerner |
| 5,062,767 A | 11/1991 | Worley et al. |
| 5,263,823 A * | 11/1993 | Cabaret et al. ............... 416/218 |
| 8,485,784 B2 * | 7/2013 | Eastman et al. .......... 416/220 R |
| 2007/0183894 A1 | 8/2007 | Lejars et al. |
| 2010/0158675 A1 | 6/2010 | Blanchard et al. |
| 2010/0166560 A1 | 7/2010 | Blanchard et al. |
| 2011/0206504 A1 | 8/2011 | Blanchard et al. |

FOREIGN PATENT DOCUMENTS

| | | | |
|---|---|---|---|
| FR | 2 888 877 | 1/2007 | |
| GB | 2 139 295 | 11/1984 | |
| GB | 2139295 | * 11/1984 | ............... F16B 1/00 |

* cited by examiner

TURBINE ENGINE ROTOR WHEEL WITH BLADES MADE OF A COMPOSITE MATERIAL PROVIDED WITH A SPRING RING

BACKGROUND OF THE INVENTION

The present invention relates to the general field of turbomachine blades made of composite material comprising fiber reinforcement densified by a matrix.

The intended field is that of rotor wheels having composite material blades for use in aeroengines or in industrial turbines.

Proposals have already been made to fabricate turbomachine blades out of composite material. For example, reference may be made to the French patent application FR 08/58090 (not yet published) filed jointly in the names of Snecma and Snecma Propulsion Solide that describes fabricating a turbomachine blade by making a fiber preform by three-dimensional weaving and by densifying the preform with a matrix.

When a rotor wheel has blades that are made of metal, the wheel generally has a plurality of metal blades mounted via their roots on a metal disk, and a metal casing is placed around the rotor wheel.

During assembly (when cold) of the rotor wheel inside the casing, it is necessary to leave radial clearance between the tips of the blades and the casing that surrounds the rotor wheel. However, in operation (when hot), this clearance may give rise to leakage of gas between the tips of the blades and the casing.

In order to reduce the risk of such leakage appearing, the free ends of the blades are generally provided with radial labyrinth teeth, and an abradable material is mounted on the inside surface of the casing in register with the labyrinth teeth. In operation of the rotor wheel, the disk, the blades, and the casing surrounding the wheel expand so that the labyrinth teeth carried by the blades abrade the abradable material carried by the casing. As a result, the clearance that is left on mounting between the tips of the blades and the casing tends to disappear, thereby limiting gas leakage.

In contrast, when a rotor wheel has blades that are made of composite material, the differences of expansion between the wheel (made in part out of the composite material of its blades) and the casing (made of metal) can be considerable. As a result, when operating while hot, the radial clearance that is left on mounting between the labyrinth teeth of the blades and the abradable material of the casing does not disappear completely, thereby having the consequence of sealing between the rotor wheel and the casing no longer being properly provided.

OBJECT AND SUMMARY OF THE INVENTION

A main object of the present invention is thus to mitigate such drawbacks by proposing a turbomachine rotor wheel having composite material blades for which sealing with the surrounding casing can be ensured in operation.

According to the invention, this object is achieved by a rotor wheel comprising an annular mounting plate; a plurality of composite material blades mounted on the mounting plate by means of their roots, each blade also having a top platform at its tip carrying radial labyrinth teeth for abrading an abradable material carried by a casing surrounding the wheel; an orientation disk fastened coaxially around the mounting plate and including at its outer periphery a plurality of axial slots that are open at one end, each slot presenting a cross-section that matches the cross-section of a blade root so as to hold it angularly in position by co-operation of shapes; and a variable-diameter spring ring housed in part in an axial notch formed in each blade root and projecting axially relative thereto, the spring ring being suitable for coming into radial abutment against an inside surface of the orientation disk during radial outward movement of the blades relative to the mounting plate.

The rotor wheel of the invention is mounted while cold inside the casing with radial clearance being left between the labyrinth teeth of the blades and the abradable material carried by the casing. In operation, under the effect of the centrifugal force exerted by the wheel, the blades move radially outwards relative to the mounting plate, taking the spring ring with them so that it comes into radial abutment against the orientation disk. As a result, the radial clearance between the labyrinth teeth of the blades and the abradable material can be eliminated in operation. Sealing between the rotor wheel and the surrounding casing is thus properly ensured in operation.

The spring ring may be made of a material that is suitable for expanding thermally such that its diameter varies as a function of the temperature to which it is subjected. The spring ring may also be split such that its diameter varies when it is subjected to centrifugal force.

In a provision of the invention, the mounting plate includes an outwardly-projecting radial wall at an upstream end, the orientation disk being fastened to the mounting plate against a downstream end thereof.

The invention also provides a turbomachine including at least one rotor wheel as defined above.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF AN EMBODIMENT

Figure 1:
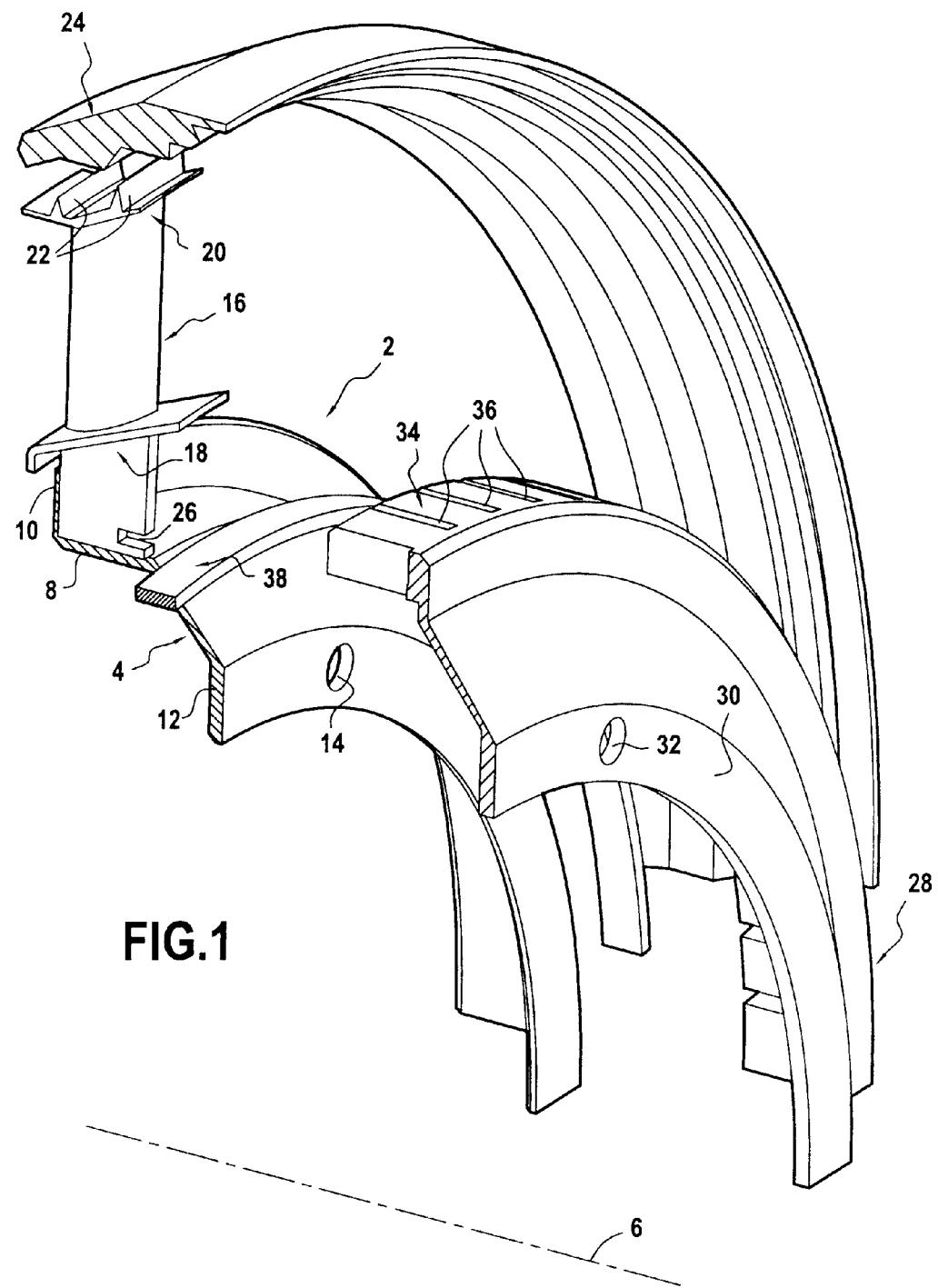
FIG. 1 is a fragmentary exploded perspective view of a rotor wheel of the invention.
Figure 2:
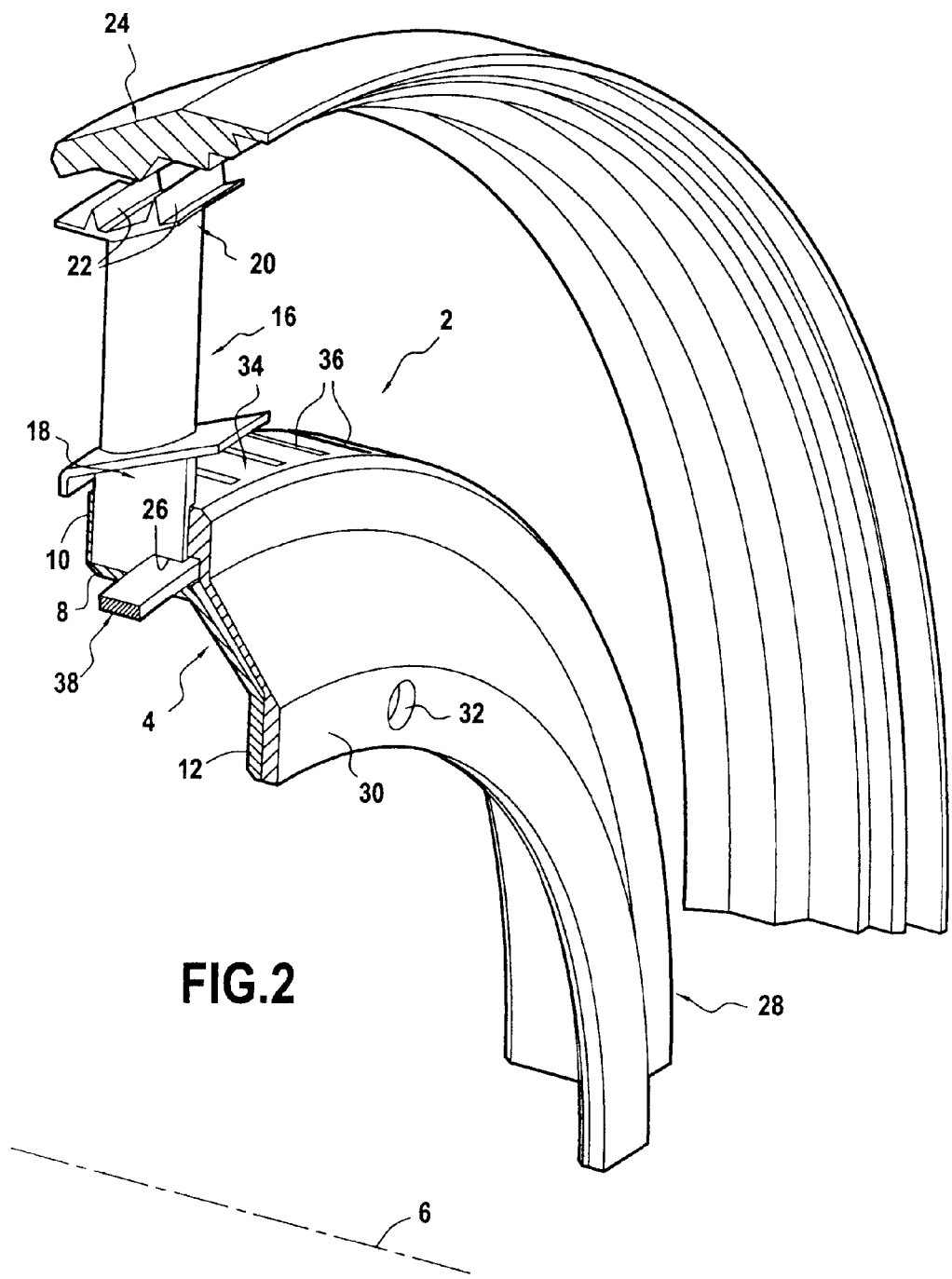
FIG. 2 is a view of the FIG. 1 wheel once assembled.

The invention is applicable to various types of turbomachine rotor wheels fitted with blades made of a composite material, and in particular the compressor and turbine rotor wheels of various gas turbine spools, e.g. a low pressure turbine rotor wheel of an aviation turbomachine, such as that shown in FIGS. 1 to 4.

In the description below, the terms "upstream" and "downstream" are used relative to the flow direction of the gas stream passing through the low pressure turbine.

The rotor wheel 2 shown in FIGS. 1 to 4 comprises in particular an annular metal mounting plate 4 that is centered on the axis of rotation 6 of the wheel. The mounting plate 4 includes in particular an axial wall 8 that is extended firstly upstream by an outwardly-directed radial upstream wall 10

(i.e. going away from the axis of rotation 6), and secondly downstream by a radial downstream wall 12 provided with holes 14.

The rotor wheel 2 also includes a plurality of blades 16 made of composite material, each having a blade root 18 mounted on the mounting plate 4, and more precisely against the axial wall 8 and the radial upstream wall 10.

Each blade 16 is made of composite material using methods known to the person skilled in the art. By way of example, reference may be made to French patent application FR 08/58090 that describes fabricating such a blade that comprises fiber reinforcement obtained by three-dimensional weaving of yarns, and densification by means of a matrix.

Each blade 16 is also provided at its free end (or tip) with a top platform 20, which in turn is provided with radial labyrinth teeth 22 for abrading in conventional manner an abradable material 24 mounted on the inside surface of a metal annular casing centered on the axis 6 and surrounding the rotor wheel (casing not shown in the figures).

As shown more precisely in FIG. 1, each blade 16 includes an axial notch 26 formed in its downstream side in its root 18.

The rotor wheel 1 further includes a metal orientation disk 28 that is fastened coaxially around the mounting plate 4.

More precisely, this orientation disk 28 is mounted around the downstream side of the mounting plate. At its downstream end, it has a radial attachment wall 30 that bears axially against the radial downstream wall 12 of the mounting plate 4, this attachment wall 30 being provided with holes 32. Fastener systems (not shown in the figures), e.g. of the nut and bolt type, pass through the respective holes 14 and 32 in the mounting plate 4 and the orientation disk 28, thereby fastening the orientation disk to the mounting plate.

At its outer periphery, the orientation disk 28 includes an axial wall 34 having a plurality of axial slots 36 that are open at their upstream ends. In cross-section (i.e. in a radial plane perpendicular to the axis 6), each slot 36 presents a section that matches the cross-section of a corresponding blade root 18 (see FIG. 4). As a result, the slots 36 of the orientation disk serve to hold each blade root angularly by means of co-operating shapes, i.e. it serves to prevent any swiveling of the blade roots about their main axes.

Finally, the rotor wheel 2 includes a spring ring 38 that is housed in part in the axial notches 26 of the blade roots 18 so as to project axially therefrom.

The spring ring 38 is of variable diameter, i.e. depending on the temperature and/or physical conditions of which it is subjected, it is capable of increasing in diameter.

The spring ring may thus be made of a material that is suitable for expanding thermally so that its diameter varies as a function of the temperature to which it is subjected. For example, the spring ring may be made of a metal of the cobalt steel or nickel steel type.

Figure 5:
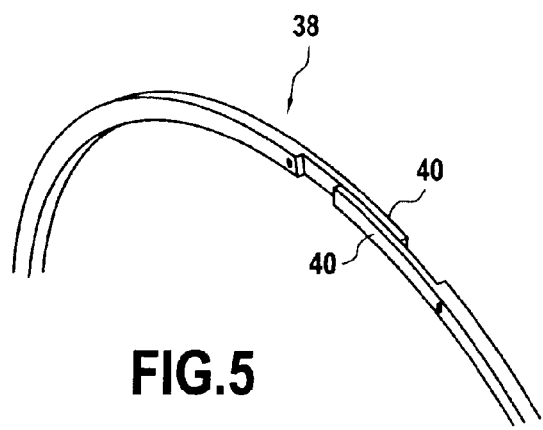
FIG. 5 is a fragmentary perspective view of a spring ring suitable for use in the rotor wheel of the invention.

The spring ring may also be split so that its diameter varies on being subjected to centrifugal force. FIG. 5 shows a fragment of an example of a spring ring 38 that is split. In FIG. 5, the spring ring 38 is not continuous all around its circumference but presents two free ends 40 having respective substantially plane portions that overlap over a certain angle. It will readily be understood that when centrifugal force is applied to such a spring ring (i.e. when it is subjected to radial force), the two free ends 40 will tend to move apart from each other, thereby increasing the diameter of the ring.

The ring may also present both kinds of characteristic (i.e. it may be made of a material that expands thermally and it may also be open). It is also possible to act on the section of the spring ring.

Figures 3A, 3B:
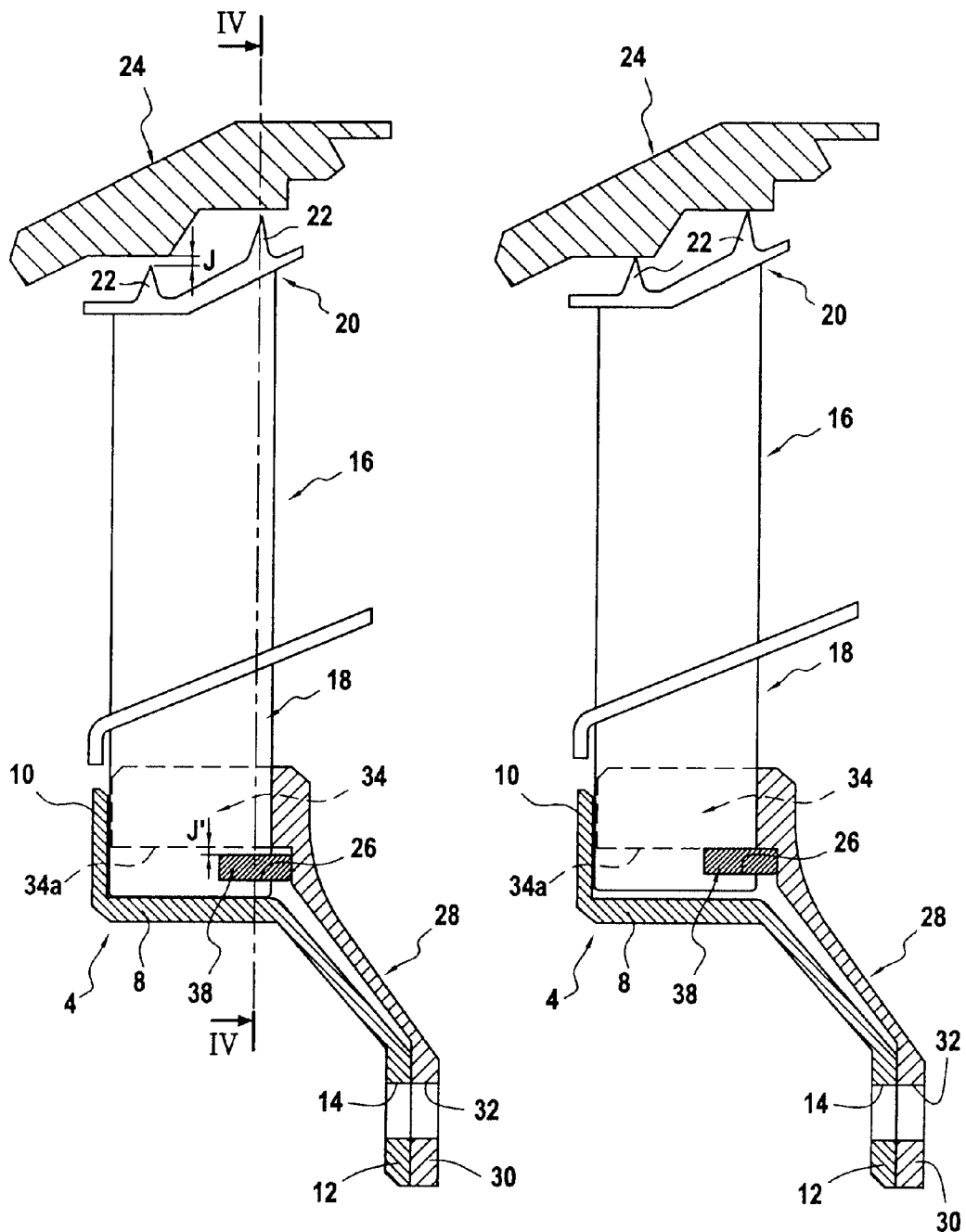
FIGS. 3A and 3B are longitudinal section views of the wheel of FIGS. 1 and 2, respectively when hot and when cold.
Figure 4:
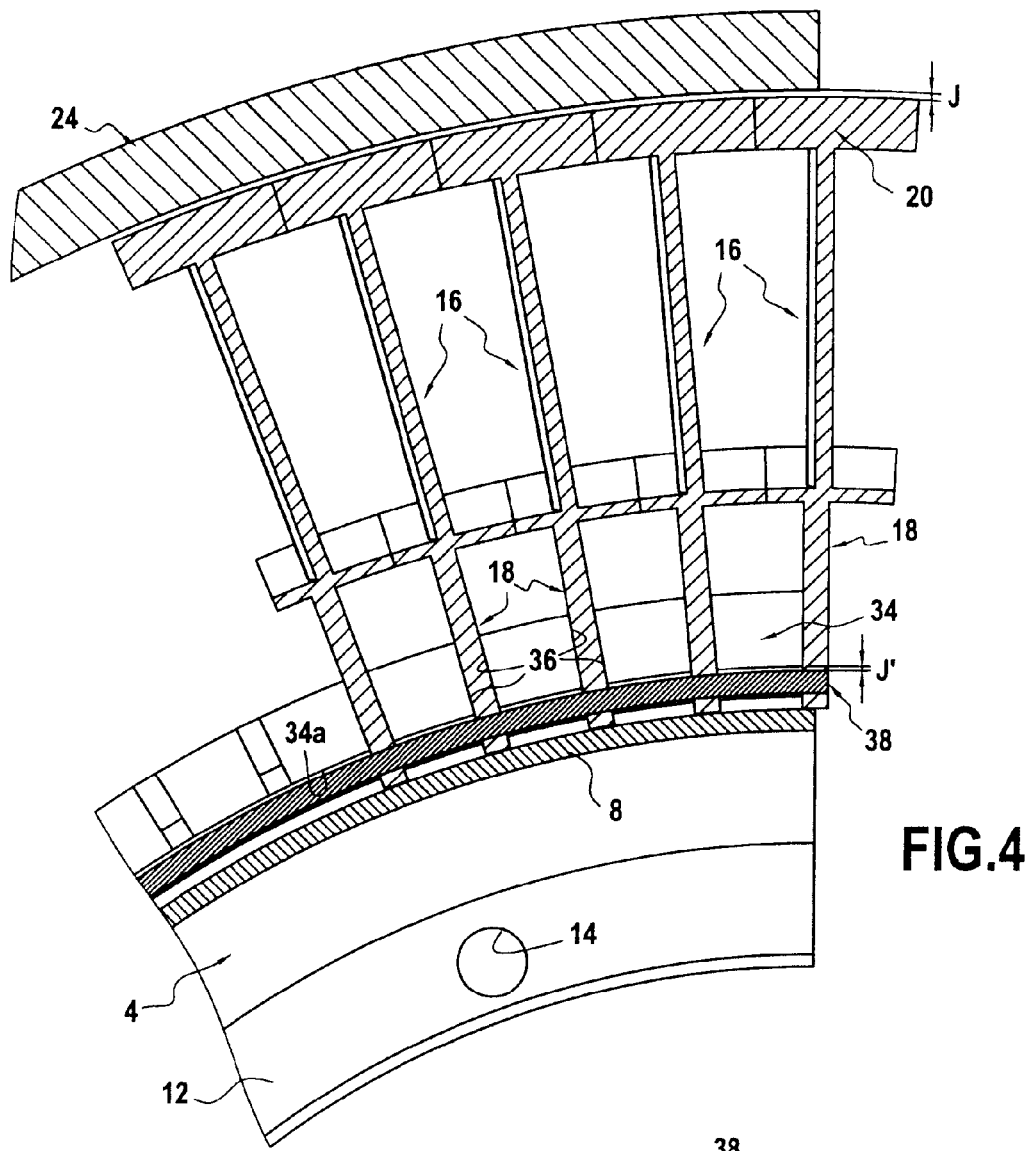
FIG. 4 is a section view on IV-IV of FIG. 3A.

Furthermore, as shown in particular in FIGS. 3A and 3B, the spring ring 38 is located radially between the axial wall 8 of the mounting plate 4 and the inside surface 34a of the axial wall 34 of the orientation disk 28. As a result, when the blades 16 move radially outwards relative to the mounting plate 4 (FIG. 3B), the spring ring 38 comes into radial abutment against the inside surface 34a of the axial wall 34 of the orientation disk.

The rotor wheel 2 of the invention operates as follows. When cold (FIGS. 3A and 4), the blades 16 are mounted on the mounting plate 4 with their respective roots 18 in radial abutment against the axial wall 8 of the mounting plate. The orientation disk 28 is then fastened around the mounting plate so as to prevent the blade roots from swiveling. This assembly performed while cold allows radial clearance J to be left between the labyrinth teeth 22 of the top platform 20 of the blades and the abradable material 24. This radial clearance J is calculated to correspond substantially to the radial clearance J' that exists when cold between the spring ring 38 and the inside surface 34a of the axial wall 34 of the orientation disk 28.

When hot (FIG. 3B), i.e. while the rotor wheel is in operation, the casing carrying the abradable material 24, the mounting plate 4, and the orientation disk 28, which are all made of metal, expand under the effect of the heat given off by the gas passing through the turbine such that their respective diameters increase. The blades 16 are made of composite material so they expand only very little. Furthermore, under the effect of the centrifugal force generated by the rotor wheel rotating, the blades 16 tend to move radially outwards relative to the mounting plate 4 so as to cause the radial clearance J between the labyrinth teeth 22 of the top platforms 20 of the blades and the abradable material 24 to disappear. The spring ring 38, which also increases in diameter (by thermal expansion and/or by the effect of centrifugal force), serves to damp this radial outward movement of the blades and to ensure that the blades are in radial abutment (by co-operation with the inside surface 34a of the axial wall 34 of the orientation disk 28). Sealing between the rotor wheel and the casing that surrounds it is thus properly ensured in operation.

The invention claimed is:

1. A turbomachine rotor wheel comprising:
   blades of composite material;
   an annular mounting plate;
   a plurality of composite material blades mounted on the mounting plate by their roots, each blade also including a top platform at its tip carrying radial labyrinth teeth for abrading an abradable material carried by a casing surrounding the wheel;
   an orientation disk fastened coaxially around the mounting plate and including at its outer periphery a plurality of axial slots that are open at one end, each slot presenting a cross-section that matches the cross-section of a blade root so as to hold it angularly in position by co-operation of shapes; and
   a variable-diameter spring ring housed in part in an axial notch formed in each blade root and projecting axially relative thereto, the spring ring configured to come into radial abutment against an inside surface of the orientation disk during radial outward movement of the blades relative to the mounting plate.

2. A wheel according to claim 1, wherein the spring ring is made of a material that expands thermally such that its diameter varies as a function of a temperature to which it is subjected.

3. A wheel according to claim 1, wherein the spring ring is split such that its diameter varies when it is subjected to centrifugal force.

4. A wheel according to claim 1, wherein the mounting plate includes an outwardly-projecting radial wall at an upstream end, the orientation disk being fastened to the mounting plate against a downstream end thereof.

5. A turbomachine including at least one rotor wheel according to claim 1.

* * * * *